US010579330B2

(12) United States Patent
Koul et al.

(10) Patent No.: US 10,579,330 B2
(45) Date of Patent: Mar. 3, 2020

(54) AUTOMATIC VISUAL DISPLAY OF AUDIBLY PRESENTED OPTIONS TO INCREASE USER EFFICIENCY AND INTERACTION PERFORMANCE

(71) Applicant: Microsoft Technology Licensing, LLC, Redmond, WA (US)

(72) Inventors: Anirudh Koul, Sunnyvale, CA (US); Vinay Vyas Vemuri, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 584 days.

(21) Appl. No.: 14/711,758

(22) Filed: May 13, 2015

(65) Prior Publication Data

US 2016/0335050 A1 Nov. 17, 2016

(51) Int. Cl.
*G06F 3/16* (2006.01)
*G06F 3/0488* (2013.01)
(Continued)

(52) U.S. Cl.
CPC ............ *G06F 3/167* (2013.01); *G06F 3/0482* (2013.01); *G06F 3/0488* (2013.01);
(Continued)

(58) Field of Classification Search
CPC .... G06F 3/167; G06F 3/0482; G06F 3/04842; G06F 17/30864; G06F 3/0488; H04M 1/7255
(Continued)

(56) References Cited

U.S. PATENT DOCUMENTS 6,104,790 A 8/2000 Narayanaswami
6,920,425 B1 7/2005 Will et al.
(Continued)

FOREIGN PATENT DOCUMENTS

| CN | 103118206 A | 5/2013 |
| CN | 103139404 A | 6/2013 |
| KR | 20130059278 A | 6/2013 |

OTHER PUBLICATIONS

"Altar Smart IVR (Visual IVR)—English Version", Retrieved from : <<https://www.youtube.com/watch?v=UoJ440099zVU>>, Sep. 6, 2013, 1 Page.

(Continued)

*Primary Examiner* — Tadesse Hailu
*Assistant Examiner* — Darrin Hope
(74) *Attorney, Agent, or Firm* — Watson Patents, PLC; Vladan M. Vasiljevic

(57) ABSTRACT

Users' interaction performance with an automated voice system is improved, as is users' efficiency, by visually displaying options audibly presented by the automated voice system, thereby enabling users to interact with the system more quickly and accurately. Options can be obtained from a centralized audible menu database with the communicational identifier utilized to establish a communication connection with the automated voice system. The database is populated from crowdsourced information, provided when users establish communicational connections with portions of automated voice systems whose options have not yet been stored in the database, and then transcribe the options that are audibly presented by the automated voice system. Transcription of audibly presented options likewise serves as a double check to verify options already displayed. User interaction generates a subsequent communicational connection, with a different communicational identifier, to a (Continued)

different portion of the automated voice system, re-triggering the mechanisms.

20 Claims, 6 Drawing Sheets

(51) Int. Cl.
  *G06F 3/0484* (2013.01)
  *G06F 17/30* (2006.01)
  *H04M 1/725* (2006.01)
  *G06F 3/0482* (2013.01)
  *G06F 16/951* (2019.01)
  *H04M 3/493* (2006.01)
  *G10L 21/10* (2013.01)

(52) U.S. Cl.
  CPC ........ *G06F 3/04842* (2013.01); *G06F 16/951* (2019.01); *G10L 21/10* (2013.01); *H04M 1/7255* (2013.01); *H04M 3/493* (2013.01); *H04M 2203/252* (2013.01); *H04M 2203/254* (2013.01)

(58) Field of Classification Search
  USPC ........................................... 715/728
  See application file for complete search history.

(56) References Cited

U.S. PATENT DOCUMENTS

| | | | |
|---|---|---|---|
| 7,027,990 B2 | 4/2006 | Sussman | |
| 7,778,397 B2 | 8/2010 | Erhart et al. | |
| 7,813,485 B2 | 10/2010 | Yin et al. | |
| 8,358,753 B2 | 1/2013 | DeLuca | |
| 8,654,934 B2 | 2/2014 | Saylor et al. | |
| 8,681,951 B1 | 3/2014 | Lavian et al. | |
| 8,687,772 B2 | 4/2014 | Forsee et al. | |
| 8,880,120 B1 | 11/2014 | Lavian et al. | |
| 8,917,823 B1 | 12/2014 | Sacks et al. | |
| 8,995,627 B1 * | 3/2015 | van Rensburg | H04M 3/493 379/88.13 |
| 2013/0022181 A1 * | 1/2013 | Or-Bach | H04M 3/493 379/88.11 |
| 2013/0078974 A1 | 3/2013 | Malo et al. | |
| 2015/0004947 A1 | 1/2015 | Li | |

OTHER PUBLICATIONS

"International Search Report and Written Opinion Issued in PCT Application No. PCT/US2016/031947", dated Oct. 4, 2016, 24 Pages.

Yin, et al., "The Benefits of Augmenting Telephone Voice Menu Navigation with Visual Browsing and Search", in Proceedings of the SIGCHI Conference on Human Factors in Computing Systems, Apr. 22, 2006, pp. 319-328.

Ziv, Orr, "Call1VU as Presented by BT Innovation", Retrieved from <<https://www.youtube.com/watch?v=iANWO-PwWXg>>, Sep. 14, 2014, 1 Page.

"Customer Collaboration", Retrieved on: Jan. 22, 2015, Available at: http://www.cisco.com/web/HR/ciscoconnect/2014/pdfs/cc_see_2014_customer_collaboration_v.2.pdf.

"What's a True Visual IVR?", Published on: Aug. 26, 2013, Available at: http://www.truevisualivr.com/.

* cited by examiner

AUTOMATIC VISUAL DISPLAY OF AUDIBLY PRESENTED OPTIONS TO INCREASE USER EFFICIENCY AND INTERACTION PERFORMANCE

BACKGROUND

Due to the ubiquity of computing devices, users are increasingly accustomed to consuming information through the visual presentation of text, as opposed to the audible presentation of spoken words. Indeed, users increasingly communicate through written correspondence including, for example, email messages, text messages, instant messaging, and the like. To facilitate such written correspondence, transcription mechanisms are sometimes utilized to enable users to dictate email messages or text messages, or to convert existing vocally spoken words, such as an audio voicemail recording, into textual content to facilitate the recipient's efficient consumption thereof.

SUMMARY

To facilitate a user's interaction with an automated voice system, the options presented by the automated voice system can be visually displayed to the user on a display device, thereby enabling the user to interact more quickly and accurately with such an automated voice system, and, in such a manner, enabling the user to improve their interaction performance and increase their efficiency. The options presented by an automated voice system can be obtained from a centralized audible menu database based upon the communicational identifier utilized to establish the communication connection with the automated voice system. The centralized audible menu database can be populated from crowdsourced information, provided when users establish communicational connections with portions of automated voice systems whose options have not yet been stored in the audible menu database, and then transcribe the options that are audibly presented in the form of spoken words, by the automated voice system. Analogously, if the options presented by an automated voice system are not obtainable from a centralized audible menu database, the options, audibly presented in the form of spoken words, can be transcribed and then visually displayed to the user on a display device. Transcription of audibly presented options can, likewise, serve as a double check to verify options already available from a centralized audible menu database, including options that can have already been visually displayed to the user on a display device. User interaction with the automated voice system, such as by selecting one or more of the options presented, can generate a subsequent communicational connection, with a different communicational identifier, to a different portion of the automated voice system, re-triggering the above outlined mechanisms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
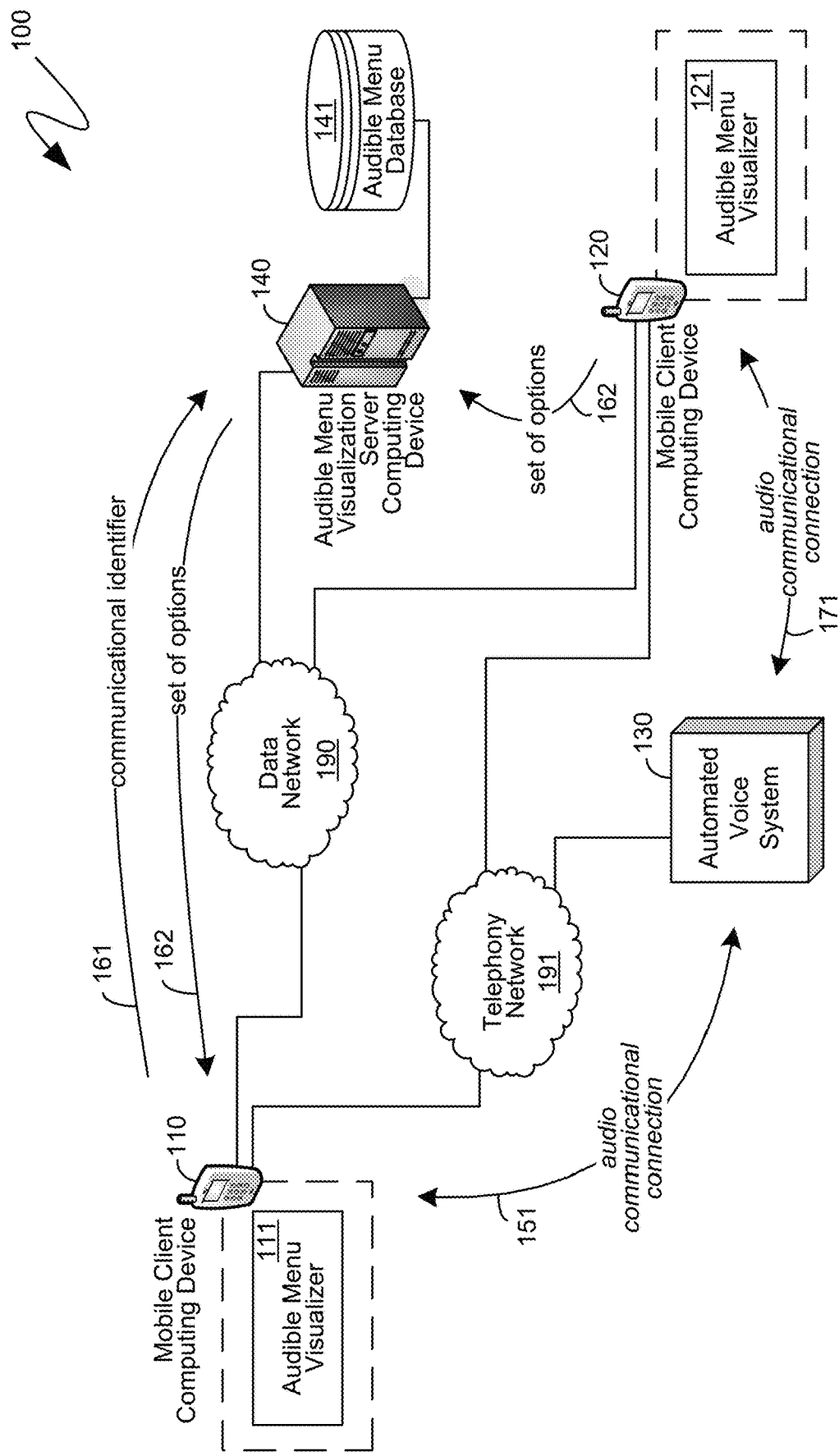
FIG. 1 is a block diagram of an exemplary system for providing visual presentation of the audibly presented options of an automated voice system.

The following description relates to improving users' interaction performance with an automated voice system, and, thereby improving users' efficiency, by visually displaying, to the user on a physical display device, the options that are audibly presented by the automated voice system, thereby enabling users to interact more quickly and accurately with such an automated voice system. The options presented by an automated voice system can be obtained from a centralized audible menu database based upon the communicational identifier utilized to establish the communication connection with the automated voice system. The centralized audible menu database can be populated from crowdsourced information, provided when users establish communicational connections with portions of automated voice systems whose options have not yet been stored in the audible menu database, and then transcribe the options that are audibly presented, in the form of spoken words, by the automated voice system. Analogously, if the options presented by an automated voice system are not obtainable from a centralized audible menu database, the options, audibly presented in the form of spoken words, can be transcribed and then visually displayed to the user on a display device. Transcription of audibly presented options can, likewise, serve as a double check to verify options already available from a centralized audible menu database, including options that can have already been visually displayed to the user on a display device. User interaction with the automated voice system, such as by selecting one or more of the options presented, can generate a subsequent communicational connection, with a different communicational identifier, to a different portion of the automated voice system, re-triggering the above outlined mechanisms.

The techniques described herein make reference to the visual presentation of options that are audibly presented by an automated voice system. As utilized herein, the term "automated voice system" means any automated system that presents user-selectable options by audibly speaking, whether with a computer-generated voice, or with recordings of human voices, those options in the form of voiced words, irrespective of the manner in which users establish communication with such a system or provide user input to such a system. Consequently, the term "automated voice system" includes so-called "interactive voice response", or "IVR" systems, automated attendant systems, and the like. While automated voice systems, as that term is utilized herein, include systems with which a user establishes communications through telephonic means, other communicational connections supportive of voice transmission are equally contemplated and encompassed by the term "automated voice system". Additionally, references herein to a "communicational identifier" mean a collection of alphanumeric characters that either uniquely identify a specific set of options of an automated voice system, or uniquely identify the input required to establish a communicational connection with the automated voice system and reach the specific set of options. For example, a telephone number can be a communicational identifier of a primary set of options of an automated voice system accessible through telephonic mechanisms, such as by dialing the telephone number. As another example, a telephone number in combination with, or having concatenated thereto, additional numeric entries indicative of sequential selections of a sequence of options can also be a single communicational identifier, namely of the set of options of the automated voice system that would be presented once the telephone number was dialed and the selections were sequentially made in response to sequentially presented options by the automated voice system. Other communicational identifiers can include network addresses, domain names, webpages, and other like communication identifiers. Lastly, as utilized herein, the term "menu" means a collection of alternatively selectable options that are presented to the user, either simultaneously, or in sequence.

While the techniques described herein are directed to the visual presentation of options that are audibly presented by an automated voice system, they are equally applicable to other forms of presentation, such as braille, whereby textual content, indicative of options, is presented to a user in a format differing from that in which such options were initially presented to the user.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 is shown as comprising mobile client computing devices, such as the exemplary mobile client computing devices 110 and 120, which are both communicationally coupled to a data network, such as the exemplary data network 190. The data network 190 also has communicationally coupled to it a centralized system, for aiding in the visual display of options that are audibly presented by an automated voice system, represented by the exemplary audible menu visualization server computing device 140 and the audible menu database 141 accessible thereby.

While the exemplary mobile computing devices 110 and 120 can be communicationally coupled to the exemplary data network 190, they can also be coupled to a telephony network, such as the exemplary telephony network 191. As will be recognized by those skilled in the art, a data network, such as the exemplary data network 190, and a telephony network, such as exemplary telephony network 191 can be overlaid one on top of another. For example, modern cellular communicational connections can support telephony communications as a form and subset of data communications. As another example, prior cellular communicational connections typically supported data communications as a form and subset of telephony communications. Consequently, while the exemplary data network 190, and the exemplary telephony network 191, are illustrated as separate networks in the exemplary system 100 of FIG. 1, such a representation is provided strictly for illustrative convenience and is not meant to signify that the exemplary data network 190 and the exemplary telephony network 191 must be separate and distinct networks from one another.

Also illustrated as being communicationally coupled to the exemplary telephony network 191 is an automated voice system, such as the exemplary voice system 130. The exemplary mobile computing device 110 is illustrated, in the exemplary system 100 of FIG. 1, as having established an audio communicational connection 151 with the exemplary automated voice system 130, namely via the exemplary telephony network 191. Through such an exemplary audio communicational connection 151, the exemplary mobile client computing device 110 can receive, and audibly present to the user, as generated sound in the form of voiced words, one or more options offered by the automated voice system 130. While a user of the mobile client computing device 110 could listen to such options, as audibly presented, according to one aspect an audible menu visualizer, such as the audible menu visualizer 111, can comprise computer-executable instructions that can present such options to the user of the mobile client computing device 110 in a visual manner by displaying such options on a physical display device that is part of, or otherwise communicationally coupled to, the mobile client computing device 110.

The audible menu visualizer 111 can transcribe the options being presented by the automated voice system 130 in an audible manner, thereby facilitating their visual display to the user of the mobile client computing device 110. For greater efficiency and accuracy, according to one aspect, the audible menu visualizer 111 can communicate with centralized mechanisms, such as, for example, the audible menu visualization server computing device 140, and receive therefrom the options being presented by the automated voice system 130 without the audible menu visualizer 111 having to first transcribe such options. For example, and as illustrated in the exemplary system 100 of FIG. 1, the audible menu visualizer 111 can provide a communicational identifier, such as exemplary communication identifier 161, to the audible menu visualization server computing device 140. As indicated previously, such a communication identifier can be a telephone number, such as the telephone number utilized to reach the automated voice system 130, or can be the telephone number in combination with additional digits representing sequential option selections from prior option menus sequentially presented by the automated voice system 130. With such a communicational identifier 161, the audible menu visualization server computing device 140 can reference an audible menu database, such as the exemplary audible menu database 141, to determine if the set of options corresponding to the communicational identifier 161 is already known and stored in the audible menu database 141. If the set of options corresponding to the communicational identifier 161 is already known and stored in the audible menu database 141, the audible menu visualization server computing device 140 can return such a set of options 162 to the audible menu visualizer 111 of the mobile client computing device 110. The audible menu visualizer 111 can then visually display such options 162 to the user of the mobile client computing device 110 without having to wait for the automated voice system 130 to finish enumerating such options, in an audible manner, and can, thereby, increase the efficiency with which such options are visually displayed to the user. If the audible menu database 141 does not comprise a set of options 162 corresponding to the communication identifier 161, the audible menu visualization server computing device 140 can return an indication, to the audible menu visualizer 111 of the mobile client computing device 110, indicating that the communication identifier 161, provided by the audible menu visualizer 111, has no corresponding set of options 162 known to the audible menu visualization server computing device 140. The audible menu visualizer 111 can, as will be described in further detail below, then proceed to transcribe the options being presented by the automated voice system 130 in an audible manner, and can visually display such options to the user of the mobile client computing device 110.

Additionally, according to one aspect, the audible menu visualizer 111 can provide the transcription, of the options that are audibly presented by the automated voice system 130, to the audible menu visualization server computing device 140 to store in the audible menu database 141. In such a manner, the audible menu database 141 can be built through crowdsourced efforts. For example, in the illustrated example of FIG. 1, where a set of options 162, corresponding to the communication identifier 161, was already stored in the audible menu database 140, such a set of options 162 can first have been transcribed by another computing device that established an audio communicational connection with the automated voice system 130 utilizing the same communication identifier 161. Consequently, the exemplary system 100 shown in FIG. 1 comprises another computing device, such as the exemplary mobile client computing device 120, establishing audio communicational connection, such as the exemplary audio communication connection 171, with the automated voice system 130. Through such an audio communicational connection 171, the exemplary mobile client computing device 120 can have received the set of options 162 from the automated voice system 130 in an audible manner in the form of spoken words. The exemplary audible menu visualizer 121, executing on the exemplary mobile client computing device 120, can have transcribed the spoken words, received via the audio communicational connection 171, from the automated voice system 130, in order to visually display the set of options 162 to the user of the mobile client computing device 120. In addition, mobile client computing device 120 can provide the transcribed set of options 162 to the audible menu visualization server computing device 140. In such a manner, the audible menu database 141, communicationally coupled with the audible menu visualization server computing device 140, can be updated with the set of options 162 such that, when the audible menu visualization server computing device 140 subsequently receives the same communicational identifier 161 from the audible menu visualizer 111 executing on the mobile client computing device 110, the audible menu database 141 can already comprise the set of options 162, which can then be returned to the audible menu visualizer 111, such as in the manner described above.

Figure 2:
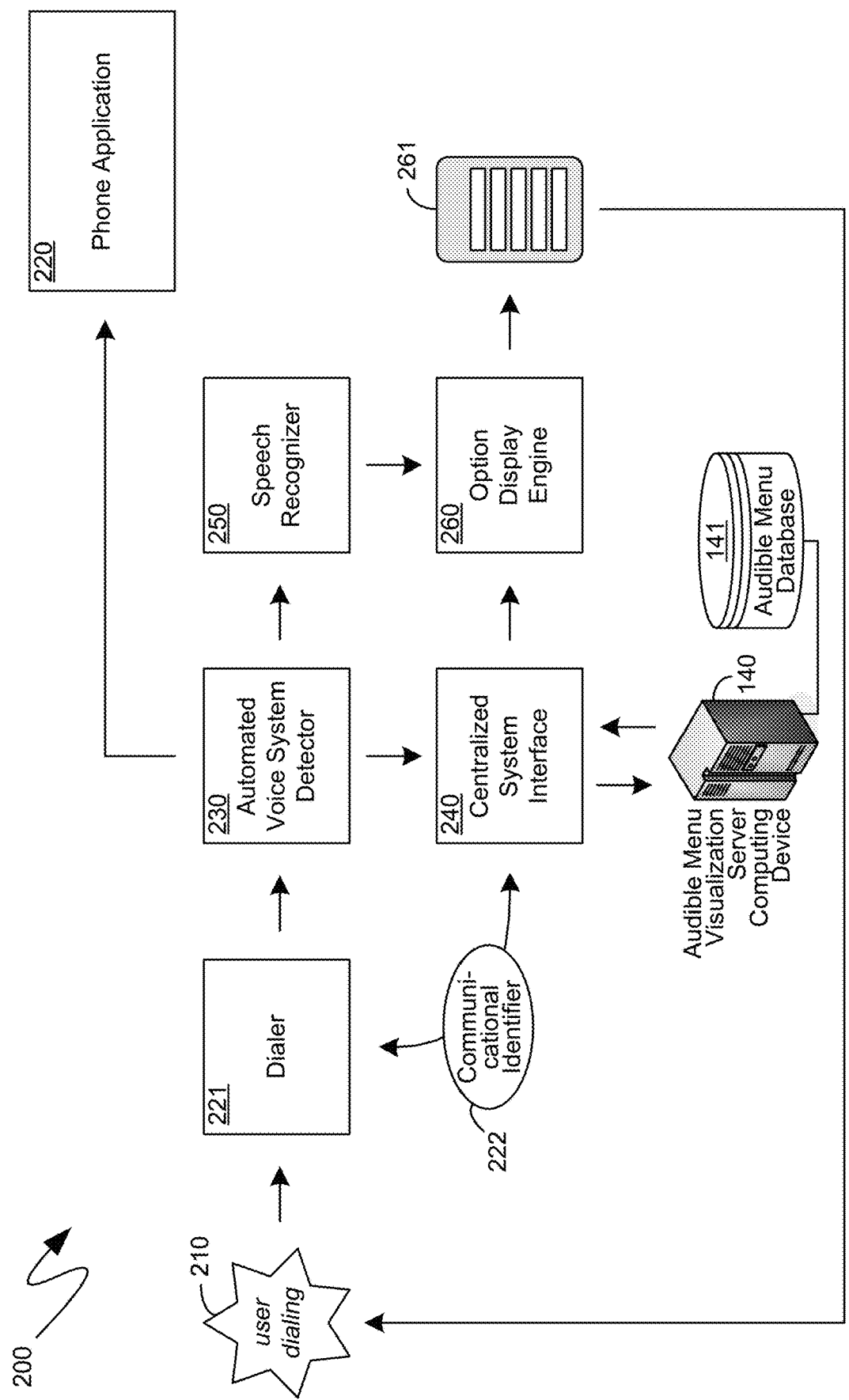
FIG. 2 is a block diagram of exemplary components for providing visual presentation of the audibly presented options of an automated voice system.

Turning to FIG. 2, the exemplary system 200 shown therein illustrates an exemplary set of components that can provide functionality, such as that described above in reference to audible menu visualizers, that can display automated voice system options to a user that are otherwise presented by the automated voice system in an audible manner in the form of voiced words. A user action establishing a communicational connection with an automated voice system can trigger the operation of the exemplary components illustrated in FIG. 2. As indicated previously, multiple different types of communicational connections with an automated voice system are contemplated by the descriptions provided herein. However, for ease of reference and illustration, the exemplary system 200 of FIG. 2 illustrates a communicational connection with an automated voice system that is established through a telephony network. Consequently, the exemplary system 200 of FIG. 2 comprises the user dialing action 210, by which a communicational connection can be established through a telephony network, and which can also be a mechanism for user option selection and other feedback, through the telephony network, to the automated voice system. As illustrated in the exemplary system 200 of FIG. 2, the user dialing action 210 can be directed to a dialer 221 which can perform the establishment of the communicational connection through the telephony network. More specifically, and as will be recognized by those skilled in the art, the dialer 221 can utilize appropriate audio or data transmissions, such as Dual-Tone Multi-Frequency signaling (DTMF signaling) tones to establish the communicational connection to the automated voice system through the telephony network.

Once the dialer 221 establishes a communicational connection, an automated voice system detector, such as the exemplary automated voice system detector 230, can monitor the communication connection established by the dialer 221 in order to determine whether that communicational connection is with an automated voice system. More specifically, the automated voice system detector 230 can monitor the audio being exchanged through the communicational connection established by the dialer 221 to detect audio indicative of an automated voice system. For example, the automated voice system detector 230 can monitor the audio being exchanged for specific spoken phrases such as "press one for" and then a recitation of an option. As another example, the automated voice system detector 230 can monitor the audio being exchanged for a lack of two-way communication that would be indicative of a user merely listening to an automated voice system, as opposed to speaking with another human. In yet another example, the automated voice system detector 230 can monitor the audio being exchanged for sound patterns or variances, pitch, timbre, variability in speed and other vocal aspects that are indicative of computer-generated voices, as opposed to human voices.

If the automated voice system detector 230 determines that the communicational connection established by the dialer 221 is not with an automated voice system, the automated voice system detector 230 can cease monitoring and enable the communicational connection established by the dialer 221 to proceed in the traditional manner. More specifically, and as will be recognized by those skilled in the art, dialing functionality, such as that embodied by the exemplary dialer 221, can be part of an application, such as the exemplary phone application 220, that can provide telephonic functionality, including the ability to establish telephonic communicational connections, and exchange audio and other content through such communicational connections. For ease of illustration, the exemplary dialer 221 is illustrated as a separate component from the exemplary phone application 220 in FIG. 2, though, as indicated, the dialer 221 can be a subcomponent of the phone application 220. Thus, if the automated voice system detector 230 determines that the communicational connection established by the dialer 221 is not to an automated voice system, the automated voice system detector 230 can allow the phone application 220 to continue facilitating and providing for such a communicational connection in a traditional manner and without further interference by the automated voice system detector 230 or others of the components described below. As indicated previously, mechanisms described herein are presented, for the sake of clarity, within the context of telephonic automated voice systems, and, as such, the exemplary application 220 is illustrated as a phone application 220. Nevertheless, as also indicated previously, the mechanisms described herein are equally applicable to other types of automated voice systems.

Turning back to the automated voice system detector 230, if the automated voice system detector 230 determines that the communicational connection established by the dialer 221 is with an automated voice system, the automated voice system detector 230 can invoke a centralized system interface, such as the exemplary centralized system interface 240, to interface with a centralized system, such as that represented by the audible menu visualization server computing device 140, and obtain therefrom the options being presented by the automated voice system with which the dialer 221 has established a communicational connection. More specifically, and as described in detail above, the audible menu visualization server computing device 140 can be communicationally coupled to an audible menu database 141 that can comprise associations between sets of options and communicational identifiers utilized to establish communicational connections with automated voice systems presenting such options, such as the communicational identifier represented by the numbers dialed by the dialer 221 in establishing the communicational connection with the automated voice system that was detected by the automated voice system detector 230. To facilitate interaction with a centralized system, in order to obtain a corresponding set of options therefrom, a communicational identifier, such as the exemplary communicational identifier 222, can be provided, by the centralized system interface 240, to such a centralized system. Although the exemplary communication identifier 222 is illustrated as being obtained, by the centralized system interface 240, from the dialer 221, such a communicational identifier 222 can be provided to the centralized system interface 240 by other components, such as the automated voice system detector 230, or any other component monitoring the dialer 221, or otherwise able to interface with the dialer 221 to obtain therefrom the numbers dialed by the dialer 221.

Utilizing the communication identifier 222, the centralized system, such as that represented by the exemplary audible menu visualization server computing device 140, can reference an audible menu database, such as exemplary audible menu database 141, to determine whether a corresponding set of options is known for the communication identifier 222. If such a set of options is known, and stored in the audible menu database 141 as corresponding to the communication identifier 222, such a set of options can be returned to the centralized system interface 240, and the centralized system interface 240 can cause such options to be displayed on a display device in the form of the user interface, such as exemplary user interface 261. To provide for the display of options on a display device, an option display engine, such as the exemplary option display engine 260, can be utilized. The option display engine 260, according to one aspect, can receive the options to be displayed, such as from the centralized system interface 240, or from a speech recognizer 250, described in further detail below, and can cause such options to be displayed in a user interface, such as exemplary user interface 261, thereby facilitating the user's consumption of, and selection of such options.

More specifically, and as detailed above, the visual presentation of options, such as through the exemplary user interface 261, can enable a user to read and understand such options more quickly and more thoroughly than if the user were merely presented with such options in an audible manner through spoken words voiced by the automated voice system with which the dialer 221 had established communicational connection. Because the user is able to read and understand such options more quickly and more thoroughly, the user's efficiency and interaction performance are increased as compared with having to listen while such options are spoken to the user by the automated voice system through the communicational connection established by the dialer 221. Similarly, the visual presentation of options, such as through the exemplary user interface 261, enables a user to more accurately select one or more options, thereby further increasing the user's efficiency and interaction performance.

According to one aspect, the centralized system interface 240 can establish a communicational connection with a centralized system, such as that provided by the audible menu visualization server computing device 140, that can be separate and distinct from the communicational connection established with the automated voice system by the dialer 221. In another aspect, the communicational connection between the centralized system interface 240 and a centralized system can be established across the same data communicational channels as the communicational connection with the automated voice system that was established by the dialer 221. Irrespective of the nature of the communicational connection, the options of the automated voice system, corresponding to the communication identifier 222, that are provided by a centralized system, such as the audible menu visualization server computing device 140, can be provided as text, or other like data, to facilitate the display of such options in a user interface, such as the exemplary user interface 261. Consequently, references herein to a "set of options", independently of any reference to a specific manner of presentation, mean the options themselves as an informational construct, and not the mere voicing of such options in the form of spoken words. By contrast, when referring to the voicing of options in the form of spoken words, such as would be spoken by an automated voice system through a traditional telephonic communicational connection, reference will be explicitly made to the fact that such options are being presented in an audible manner in the form of spoken or voiced words, and such references are meant to be agnostic as to the carrier medium or transmission mechanisms by which such spoken words are delivered and audibly voiced to the user.

Turning back to the exemplary system 200 of FIG. 2, if the centralized system interface 240 is not able to obtain a set of options from a centralized system that correspond to the communication identifier 222, or, alternatively, even if such options are obtained from a centralized system, the automated voice system detector 230 can also invoke a speech recognizer 250 to transcribe the audible presentation of the options in the form of words voiced, or spoken, by the automated voice system. As will be recognized by those skilled in the art, a speech recognizer, such as exemplary speech recognizer 250 can utilize known transcription mechanisms to interpret sound, in the form of spoken words, and derived therefrom the spoken words themselves in a data format, such as textual data format, that is different from the sound of those words being spoken. Consequently, as an automated voice system, such as the automated voice system with which the dialer 221 established a communicational connection, speaks words to a user that correspond to both the options being offered and the manner in which the user is to indicate selection of such options, the speech recognizer 250 can transcribe such words and can, thereby, identify the options being offered by such an automated voice system and can identify the corresponding selection mechanisms.

According to one aspect, the speech recognizer 250 can identify known or common phrasings to distinguish between options and corresponding selection mechanisms. For example, within the context of telephonic communications, selection mechanisms are typically in the form of numeric entries corresponding to a telephone keypad. Consequently, automated voice systems typically utilize common terminology such as the words "press", "select" or "enter" followed by a numerical identifier to convey to the user the manner in which the user is to select an enumerated option. The speech recognizer 250 can transcribe the words spoken by the automated voice system, and then parse the transcription for such common terminology and the numerical identifier specified thereafter, and can, thereby, associate a particular selection mechanism with a specific option.

Similarly options can be identified based upon common terminology utilized to introduce such options such as the words "for", "to hear", "to select" and the like. Thus, the speech recognizer 250 can transcribe the words spoken by the automated voice system, and then parse this transcription for such common terminology in order to identify the options being voiced by such an automated voice system. By way of an illustrative example, if the automated voice system were to speak the phrase "for billing, press one", the speech recognizer 250 could identify the word "for", and then identify the subsequent word or phrase, in this case "billing", as the enumerated option. Similarly, the speech recognizer 250 could identify the word "press", and then identify the subsequent word, in this case "one", as the enumerated selection mechanism by which the previously enumerated option can be selected by a user. The speech recognizer 250 can then provide such an option and selection mechanism pair, namely "billing" and "one" to, for example, the option display engine 260 in order to generate a user interface, such as exemplary user interface 261 in which such an option and selection mechanism are visually displayed to the user. As another illustrative example, if the automated voice system were to speak the phrase "to hear your account summary, enter star five", the speech recognizer 250 could identify the phrase "to hear", and then identify the subsequent phrase, namely "your account summary" in the present example, as the enumerated option. Similarly, the speech recognizer 250 could identify the word "enter", and then identify the subsequent phrase, in this case "star five" as the corresponding selection mechanism. As before, the speech recognizer 250 can provide an option and selection mechanism pair, namely "your account summary" and "star five" to the option display engine 260 in order to generate a user interface in which such an option and selection mechanisms are visually displayed to the user.

In some instances, rather than proactively presenting options to a user, an automated voice system can ask a user to speak words or phrases identifying the topic reason for the user's call. In such instances, the automated voice system can confirm the user's input by reference to a predefined option that was not proactively presented. For example, upon establishing a communicational connection with an automated voice system, the automated voice system can ask the user to "say a word or phrase that describes why you're calling". In response, in the present illustrative example, the user could respond by saying "I'd like to update the address on my account". The automated voice system can then confirm user's response and align it with predefined options that were not otherwise previously enumerated, or spoken, to the user by the automated voice system. For example, in the present, illustrative example, the automated voice system could respond to the user's input by asserting that "you're calling about account maintenance, correct?" In such an instance, the speech recognizer 250 can identify the term or phrase utilized by the automated voice system as a confirmation and, accordingly, identify one of the pre-enumerated options. For example, in the present, illustrative example, the speech recognizer 250 can identify the phrase "account maintenance" as being an option that is selectable by the user.

Figure 3:
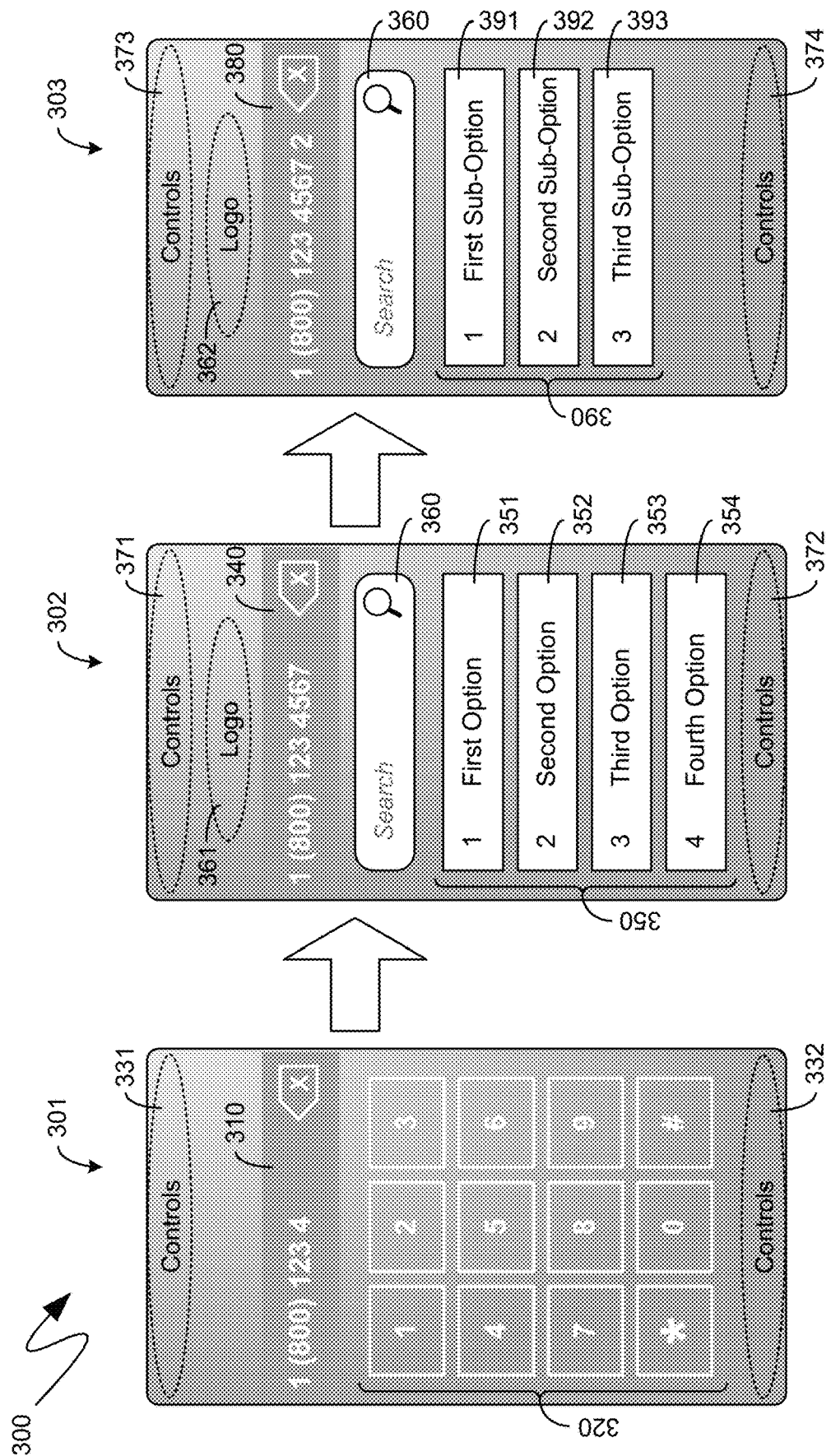
FIG. 3 is a diagram of exemplary user interfaces providing visual presentation of the audibly presented options of an automated voice system.

Turning to FIG. 3, the system 300 shown therein illustrates a temporal progression through three exemplary user interfaces, namely the exemplary user interfaces 301, 302 and 303. The exemplary user interface 301, illustrates a user interface that could be provided by a dialer or other like component for establishing a communicational connection, such as with an automated voice system. As shown in FIG. 3, the exemplary user interface 301 can comprise a keypad 320 through which a user can enter a communicational identifier to be utilized to establish the communicational connection, such as with an automated voice system. For purposes of illustration, the exemplary keypad 320 is illustrated as being part of the exemplary user interface 301, such as could be displayed on a touchscreen or other like input-capable display device where user input directed to the area of the display device corresponding to a particular number of the keypad 320 results in user entry of such a number. Additionally, the exemplary user interface 301 can comprise a communicational identifier display area 310 in which the user can view the communicational identifier being entered, such as through the exemplary keypad 320. For purposes of illustration, the communicational identifier display area 310 is shown as comprising a portion of a telephone number through which a telephonic communication connection could be established, such as within an automated voice system. Although not specifically illustrated in FIG. 3, the exemplary user interface 301 can further comprise other controls through which a user could access other functionality, including other functionality of a dialer or telephonic application, or other functionality provided by other applications executing on a computing device presenting such an exemplary user interface 301. Such controls are often placed at the top or bottom of a user interface, as illustrated by the exemplary controls areas 331 and 332.

According to one aspect, subsequent to user entry of a communicational identifier, such as a telephone number, and subsequent to the establishment of a communicational connection, such as a telephonic communication connection, with an automated voice system, the mechanisms described in detail above can be executed to provide visual display of options being audibly presented to the user in the form of voiced words by the automated voice system. The exemplary user interface 302, shown in FIG. 3, illustrates one exemplary user interface that can be generated by such mechanisms to visually display options that are audibly presented to the user by the automated voice system in the form of voiced words. More specifically, the exemplary user interface 302 can comprise visually displayed options 350 that can be displayed within an area that previously would have contained a keypad, such as exemplary keypad 320 of the exemplary user interface 301, or other like interface components utilizable by a user to establish a communicational connection. For purposes of illustration, the visually displayed options 350 comprise four options, namely the visually displayed options 351, 352, 353 and 354. Turning first to the visually displayed option 351, as illustrated in FIG. 3, such a visually displayed option can comprise indications of the selection mechanism by which such an option can be selected, as well as an indicator of the option itself, such as the phrase that was voiced by the automated voice system to describe the option. In the present example, the visually displayed option 351 can be selectable via entry of the telephonic "one" code, and, consequently, the exemplary visually displayed option 351 indicates a "1" as the selection mechanism corresponding to such an option whose title or description is also displayed within the portion of the exemplary user interface 302 dedicated to the visually displayed option 351. As in the case of the exemplary keypad 320, described above, the exemplary presentation of the visually displayed options 350 can be in accordance with touchscreen capabilities, or other analogous display and input capabilities, whereby a user can select the first option by directing user input into an area encompassed by the visually displayed option 351. Selection of such an option can result in an appropriate signal being sent to the automated voice system. Within the context of the telephonic communications described above, user selection of, for example, the visually displayed option 351 can result in the same signal being sent to the automated voice system as user input of the "1" key of the exemplary keypad 320. More generally, the visually displayed options 350 can enable the user to both visually consume options provided by an automated voice system, and to efficiently select one or more such options without departing from the display of such options, such as presented within the exemplary user interface 302.

Exemplary user interface 302 can comprise further elements that can facilitate a user's interaction with an automated voice system. For example, the exemplary user interface 302 can comprise a communicational identifier display area 340 that can be analogous to the communicational identifier display area 310, except that, within the exemplary user interface 302, for purposes of illustration, the communicational identifier display area 340 can comprise the complete communicational identifier for the initial presentation of options of the automated voice system communicationally connectable through such a communicational identifier. Additionally, the exemplary user interface 302, like the exemplary user interface 301, can comprise areas for the display and presentation of various controls, including controls that can enable a user to interact with other applications or communicational mechanisms. Within the exemplary user interface 302, such controls can, for example, be displayed within the controls areas 371 and 372.

According to one aspect, search functionality can be provided to enable a user to search the visually displayed options for specific search terms entered by the user. For example, the exemplary user interface 302 illustrates a search term entry area 360 into which the user can enter one or more search terms. Should such search terms be found in one or more of the visually displayed options, such as in one or more of the visually displayed options 350, the display of the visually displayed options 350 can be modified to highlight those of the visually displayed options 350 that comprise search terms. Alternatively, or in addition, the display of the visually displayed options 350 can be modified to remove, and no longer display, those options that do not comprise search terms. As will be recognized by those skilled in the art, such search functionality can be helpful if the user is otherwise engaged and can only quickly glance at the exemplary user interface 302, if the quantity of the visually displayed options 350 is greater than can be displayed within the exemplary user interface 302, or other like situations where it can be difficult for the user to carefully read through each option. Consequently, the aforementioned search functionality can further increase user efficiency and interaction performance.

To provide the user with additional visual information, the exemplary user interface 302 can comprise a logo of a company with whose automated voice system a communicational connection has been established. Such a logo can be displayed within the logo display area 361. More specifically, and as will be recognized by those skilled in the art, automated voice systems are often utilized by companies to facilitate interactions between the company and its customers, agents, associates, or other like individuals. As such, a logo for the company with whose automated voice system the communicational connection has been established can be displayed within the logo display area 361 as a further embellishment, and to efficiently and conveniently provide reference information to the user. Such logo information can be obtained through a variety of mechanisms. For example, the communicational identifier utilized to establish the initial communicational connection with the automated voice system can be a commonly known communicational identifier that can be associated with the company through various means including, for example, search engine databases, entity databases, and the like. Thus, to identify such a logo, a search could be performed, such as with a search engine, with the communicational identifier as a search term. As another example, the communicational identifier can be present on a homepage or other like reference source posted by, or for the benefit of the company. Such logos can be identified by first identifying the company's homepage, such as through a search utilizing the communicational identifier as a search term, and then subsequently parsing the homepage for one or more logos. As yet another example, transcription functionality utilized to transcribe the audibly presented information by the automated voice system can be extended to parse such transcriptions to identify the name of the company providing or utilizing the automated voice system. A logo, such as one that would be displayed within the logo display area 361, can be identified, such as through the above described mechanisms, by processes executing on the computing device displaying exemplary user interface 302. Alternatively, or in addition, a logo can be identified by processes executing remotely, such as the aforementioned centralized mechanisms from which the visually displayed options 350 can have been received in response to the provision of the communication identifier, such as that shown in the communicational identifier display area 340. For ease of subsequent presentation, once a logo has been identified as corresponding to a specific communicational identifier, or to an automated voice system in general, such a logo can be centrally retained, such as in the aforementioned audible menu database.

User selections of one or more of the options presented by an automated voice system can result in a different set of options being presented by the automated voice system. In such an instance, the communication identifier utilized to establish the initial communicational connection with the automated voice system, in combination with the one or more additional digits or other mechanism selection information provided to the automated voice system, can form a subsequent communicational identifier with which the subsequently presented options can be associated. For example, and with reference to FIG. 3, a user can have interacted with the exemplary user interface 302 and can have selected the second displayed option 352 causing another collection of options to be audibly presented, in the form of voiced words, by the automated voice system with which a communicational connection has been established. A new communicational identifier formed by concatenating the original communicational identifier, displayed within the communicational identifier display area 340, of the exemplary user interface 302, with the identifier entered to select the second displayed option 352, namely the number "2", is illustrated as being displayed within the communicational identifier display area 380 of the exemplary user interface 303, which represents an exemplary user interface that can be displayed subsequent to the exemplary user interface 302, after the user selects the second displayed option 352.

The above described mechanisms can utilize the new communicational identifier to obtain the options corresponding to such a new communication identifier from centralized mechanisms, or the above-described options can transcribe the options as they are audibly presented by the automated voice system in the form of voiced words. Such options can be displayed as the displayed options 390, which can be displayed to the user as part of the exemplary user interface 303, which, as indicated, can be displayed subsequent to the user's selection of the second display option 352 in the exemplary user interface 302. As with the displayed options 350, in the exemplary user interface 302, the displayed options 390, in the exemplary user interface 303, can comprise multiple options, such as exemplary displayed options 391, 392 and 393, which can display, to the user, both an option available to the user and the selection mechanism by which such an option can be selected. As before, the exemplary user interface 303 can further comprise a logo, displayed within the logo display area 362, which can be the same logo as was displayed in the logo display area 361, or a different logo, such as of a subsidiary or a different company with whose automated voice system a subsequent communicational connection was established in response to the selection of the displayed option 352. Similarly, the exemplary user interface 303 can comprise controls, such as those referenced above, which can be displayed within portions of the exemplary user interface 303, such as exemplary controls display areas 373 and 374.

Figure 4:
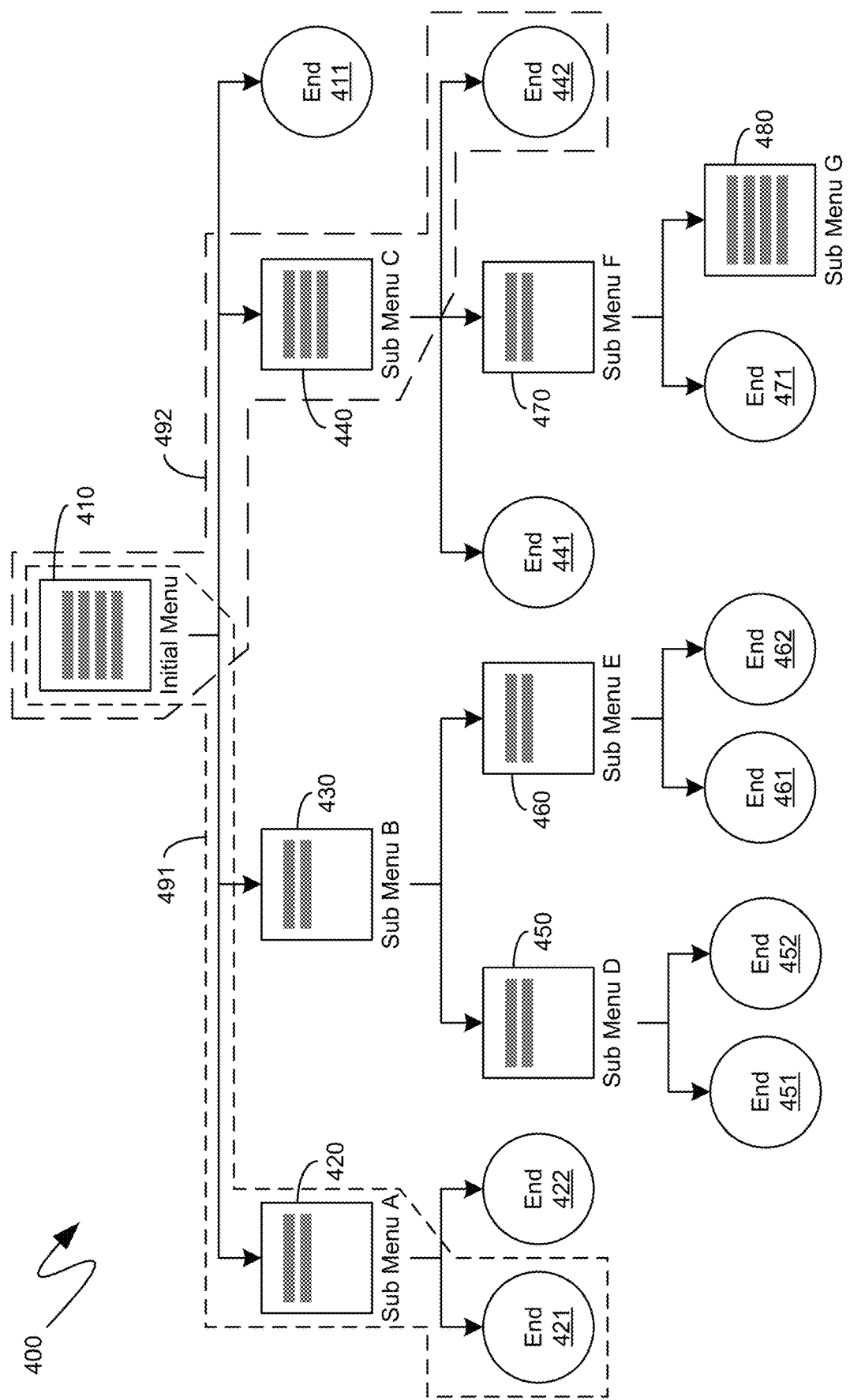
FIG. 4 is a block diagram of an exemplary option menu tree of an automated voice system.

Turning to FIG. 4, the option menu tree 400 shown therein illustrates an exemplary set of menus presentable by an automated voice system, as well as illustrating how crowdsourcing can build knowledge of such a menu tree for future reference. More specifically, and as defined previously, the term "menu", as utilized herein, means a collection of alternatively selectable options that are presented to the user, either simultaneously, or in sequence. Thus, each of the individual menus illustrated in the option menu tree 400 of FIG. 4 represents a collection of selectable options that are presented to the user in response to, either the initial establishment of communications with an automated voice system, or a subsequent selection of an option presented in a prior menu.

For example, the initial menu 410 represents the collection of options that can be presented by an automated voice system when a communicational connection is first established with the automated voice system. The exemplary initial menu 410 is illustrated in FIG. 4 as comprising four different options. User selection of a first one of those four options can result in the automated voice system audibly presenting, to the user, the options of the exemplary menu 420. Analogously, user selection of a second one of those four options, from the initial menu 410, can result the automated voice system audibly presenting, to the user, the options of the exemplary menu 430, and, user selection of a third one of those four options can result in the automated voice system audibly presenting the options of the exemplary menu 440. User selection of options can also result in the user being communicationally connected with another human such that the automated voice system is no longer communicating with the user. In such an instance, from the perspective of the automated voice system and the options presented thereby, the interactions between the automated voice system and the user can end. Consequently, in the option menu tree 400 shown in FIG. 4, the selection of options from a menu that result in the user being communicationally connected with another human, or otherwise ending their interaction with the automated voice system, are illustrated via circles marked "End", such as, for example, the ending circle 411.

By way of a simple example, to more concretely convey the illustration of FIG. 4, the initial menu 410 can, in the illustrative simple example, comprise airline-related options, such as, for example, a first option to check the status of a flight, a second option to search for a flight for which to purchase a ticket, a third option to access a frequent flyer account, and a fourth option to speak with a representative. In such a simple illustrative example, a user's selection of the first option of the initial menu 410, namely to check the status of a flight, can result in a subsequent menu, such as the exemplary menu 420, being audibly presented to the user by the automated voice system. Such a subsequent menu 420 can comprise other options, differing from the options of the initial menu 410. Continuing with the simple, illustrative example, the subsequent menu 420, presented to a user when the user selected the option to check the status of their flight from the initial menu 410, can comprise options directed to the checking of the status of a flight including, for example, the option to search for the flight by a flight number, and the option to search for the flight by entering departure and arrival cities. Within the exemplary option menu tree 400, such option selections are also illustrated via circles marked "End", because the interactions between the automated voice system in the user, while continuing sufficiently to enable the user to enter, for example, the flight number, do terminate in so far as there are no further options subsequently selectable by the user. In a similar manner, a subsequent menu 430 can be presented if the user selects the option, from the initial menu 410, to purchase a ticket, and such a subsequent menu 430 can comprise options directed to the purchase of a ticket. Likewise, a subsequent menu 440 can be presented if the user selects the option, from the initial menu 410, to access a frequent flyer account and such a subsequent menu 440 can comprise options directed to frequent flyer account access and management. In a like manner, the selection of options presented by, for example, the subsequent menus 430 in 440 can result in the automated voice system presenting the user with still further, subsequent menus such as, for example, the subsequent menus 450, 460 and 470.

According to one aspect, centralized mechanisms, such as the aforementioned audible menu visualization server computing device and audible menu database, can utilize crowdsourcing to build in option menu tree, such as the exemplary option menu tree 400, for an automated voice system by receiving transcriptions of various option menus, of the automated voice system, provided by multiple different users interacting with the automated voice system independently. For example, one user communicationally coupled with the automated voice system can be presented with the initial menu 410, can select the first option, and can, thereby, be presented with the subsequent menu 420, from which such a user can select the first option again, and reach the end of their interaction with the automated voice system. Such an interactive path through the option menu tree of such an automated voice system is illustrated by the area 491 encompassed by the short dashed lines. In proceeding, interactively, through the automated voice system, such a user's computing device, in accordance with the above described mechanisms, can transcribe the various option menus and provide them to, for example, the audible menu visualization server computing device to store such option menus within the audible menu database. A subsequent user, also communicationally coupled with the automated voice system, can, again, be presented with the initial menu 410, except that such a subsequent user can select the third option, and can't, thereby, be presented with the subsequent menu 440, from which such a user can select the third option, and reach the end of their interaction with the automated voice system. Such a different interactive path through the option menu tree is illustrated by the area 492 encompassed by the long dashed lines. As before, such a subsequent user's computing device, in accordance with the above described mechanisms, can transcribe the various option menus and provide them to the audible menu visualization server computing device to store within the audible menu database. Upon receiving the transcribed option menus from such a subsequent user, according to one aspect, the audible menu visualization server computing device can compare the transcribed option menu from the subsequent user, corresponding to the initial menu 410, to the transcribed menu option that was received from the initial user. If there is no difference, the previously stored transcribed menu option can be retained. However, for the subsequent menu 440, no prior information can have been received and, consequently, upon receipt of the transcribed menu options encompassed by the area 492, from the subsequent user, the audible menu visualization server computing device can retain the subsequent menu 440. In such a manner, transcribed option menus from different users can be utilized to build, in a crowdsourced manner, an option menu tree, such as exemplary option menu tree 400 shown in FIG. 4.

Figure 5:
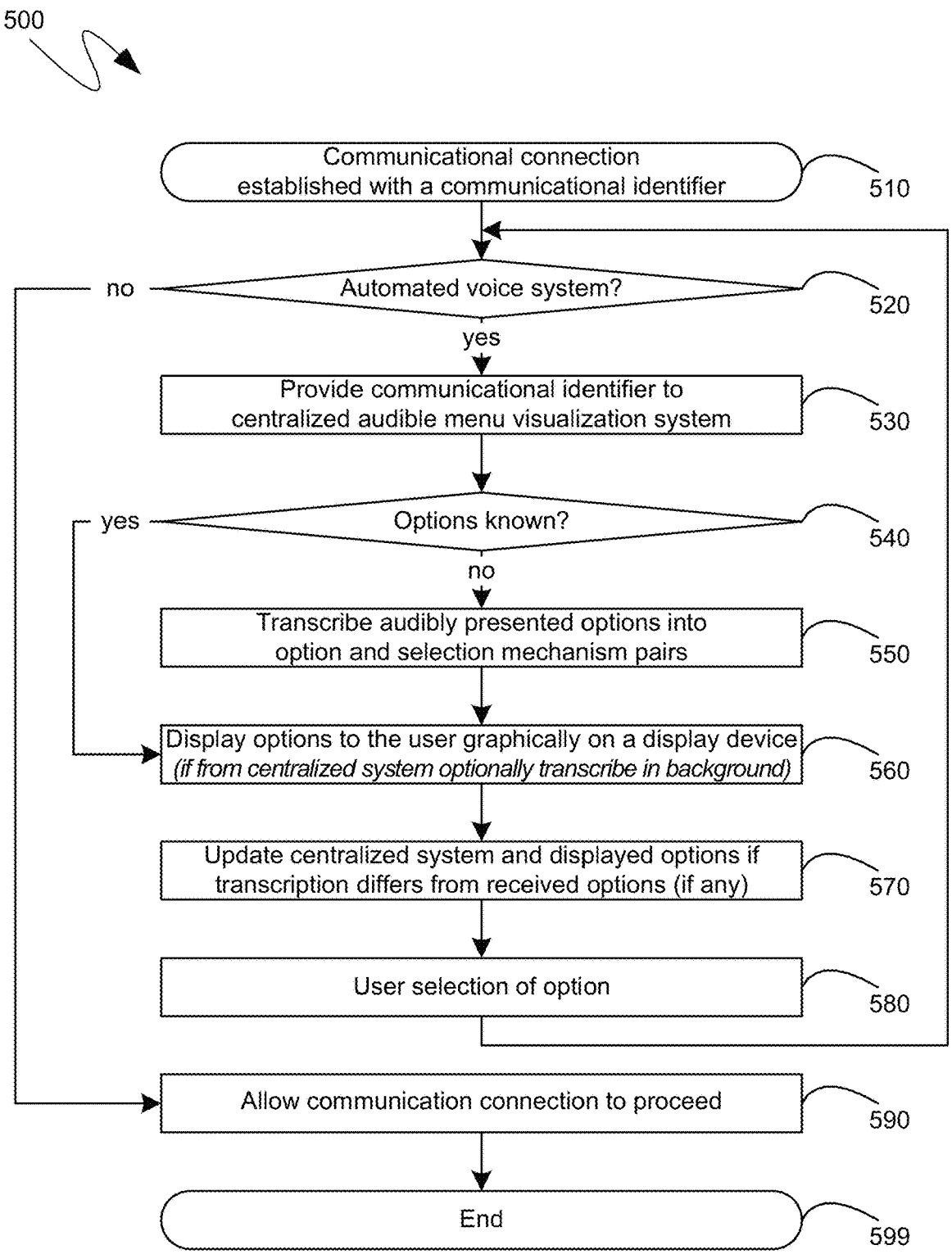
FIG. 5 is a flow diagram of an exemplary visual presentation of the audibly presented options of an automated voice system.

Turning to FIG. 5, the exemplary flow diagram 500 shown therein illustrates an exemplary series of steps that can be performed to visually display, to a user, options that are otherwise audibly presented by an automated voice system to which such a user is communicationally coupled. Initially, as illustrated by exemplary step 510, a communicational connection can be established utilizing a communicational identifier. As indicated previously, such a communicational identifier can be a telephone number, a telephone number concatenated with other numerical entries indicative of sequential option selections, or other forms of communication identifiers, such as network addresses and the like. Subsequently, at step 520, determination can be made as to whether the communicational connection that was established at step 510 is with an automated voice system. As indicated previously, such a determination can be made by monitoring the communications being sent and received as part of the communicational connection that was established at 510, such as by determining whether keywords, phrases, or other communications are being exchanged that are indicative of an automated voice system. If, at step 520, it is determined that the communicational connection that was established at step 510 is not with an automated voice system, processing can proceed to step 590 at which point the communication along such communicational connection can be allowed to proceed, and the relevant processing can end at step 599.

Conversely, if, at step 520, it is determined that the communicational connection that was established at 510 is with an automated voice system, then processing can proceed to step 530. At step 530, the communicational identifier utilized to establish the communicational connection at step 510 can be provided to a centralized audible menu visualization system, such as that embodied by the above described audible menu visualization server computing device. In response to such a communication to a centralized audible menu visualization system, information can be received that either indicates that the options of the automated voice system that corresponds to the communicational identifier provided are known, or that indicates that such options are not yet known to the centralized audible menu visualization system. At step 540, such a response can be received and, if, at step 540, such a response indicates that the options are not known, then processing can proceed to step 550, whereupon the options being audibly presented by the automated voice system, in the form of voiced words communicated through the communicational connection established at step 510, can be transcribed into option and selection mechanism pairs, such as those described in detail above. Processing can then proceed to step 560 and the option and selection mechanism pairs can be visually displayed to the user on a display device.

Returning back to step 540, if, at step 540, it is determined that the centralized audible menu visualization system has already provided options known to be associated with the communicational identifier, which was provided at step 530, processing can skip directly to step 562 display such options visually to the user on a display device. Optionally, transcription, such as that of step 550, can be performed in the background while awaiting a user's selection of an option, such as at step 580. Such background transcription can then be utilized to verify the options received from the centralized audible menu visualization system. If the transcribed options differ from those received from the centralized audible menu visualization system, or if the centralized audible menu visualization system did not, as determined at step 540, provide options associated with the communication identifier, then, at step 570, the centralized audible menu visualization system can be updated with the new, transcribed options. More specifically, the centralized audible menu visualization system can be provided with the option and selection mechanism pairs that were transcribed at step 550 for the menu of options presented by the automated voice system when a communicational connection is established with such an automated voice system utilizing the communicational identifier, as in step 510. As indicated previously, the communicational identifier can comprise, for example, the telephone number utilized to establish the initial communicational connection with the automated voice system, concatenated with other numerical values utilized to select a sequence of options in sequentially presented menus of options preceding the current menu of options that was transcribed at step 550.

According to one aspect, when providing information to update the centralized audible menu visualization system, such as at step 570, wildcard values can be utilized for portions of a communicational identifier that are not indicative of option selection, but rather indicative of the entry personally identifying information, such as credit card numbers, Social Security numbers, account numbers and the like. In such a manner, no personally identifying information can be transmitted to, or retained by the centralized audible menu visualization system. A distinction can be made between portions of a communicational identifier that are indicative of option selection, and other identifiers or values that are indicative of the entry of personally identifying information, based on the quantity or length of such identifiers. For example, option selection mechanisms typically require the user to enter one, or at most two numerical digits, such as via a telephone keypad. Consequently, should entry of a greater quantity of numerical digits be detected, all of such digits need not be concatenated to a prior communication identifier, so as to form a new communication identifier. Instead, such digits can be replaced by a wildcard value, or it can otherwise be excluded from a communicational identifier transmitted to a centralized audible menu visualization system for purposes of associating there with a menu of transcribed options and selection mechanism pairs.

Turning back to the exemplary flow diagram 500 of FIG. 5, subsequent to the provision of the option and selection mechanism pairs of a currently presented menu of options, and the communicational identifier corresponding thereto at step 570, processing can proceed to step 580, where a user can select an option, such as by selecting one or more numerical digits yet a telephone keypad. Processing can then return to step 520. As part of a subsequent pass, a determination can again be made, at step 520, as to whether the subsequent communicational connection is still with and automated voice system, now with the communicational identifier comprising the communicational identifier previously utilized to established the communicational connection at step 510 in combination with the option selection mechanism of the option selected at step 580. If, as part of a subsequent pass through step 520, it is determined that the user is no longer communicating with an automated voice system, such as, for example, if the user was transferred to a human, then processing can proceed with step 590 and end at step 599, as described above.

Figure 6:
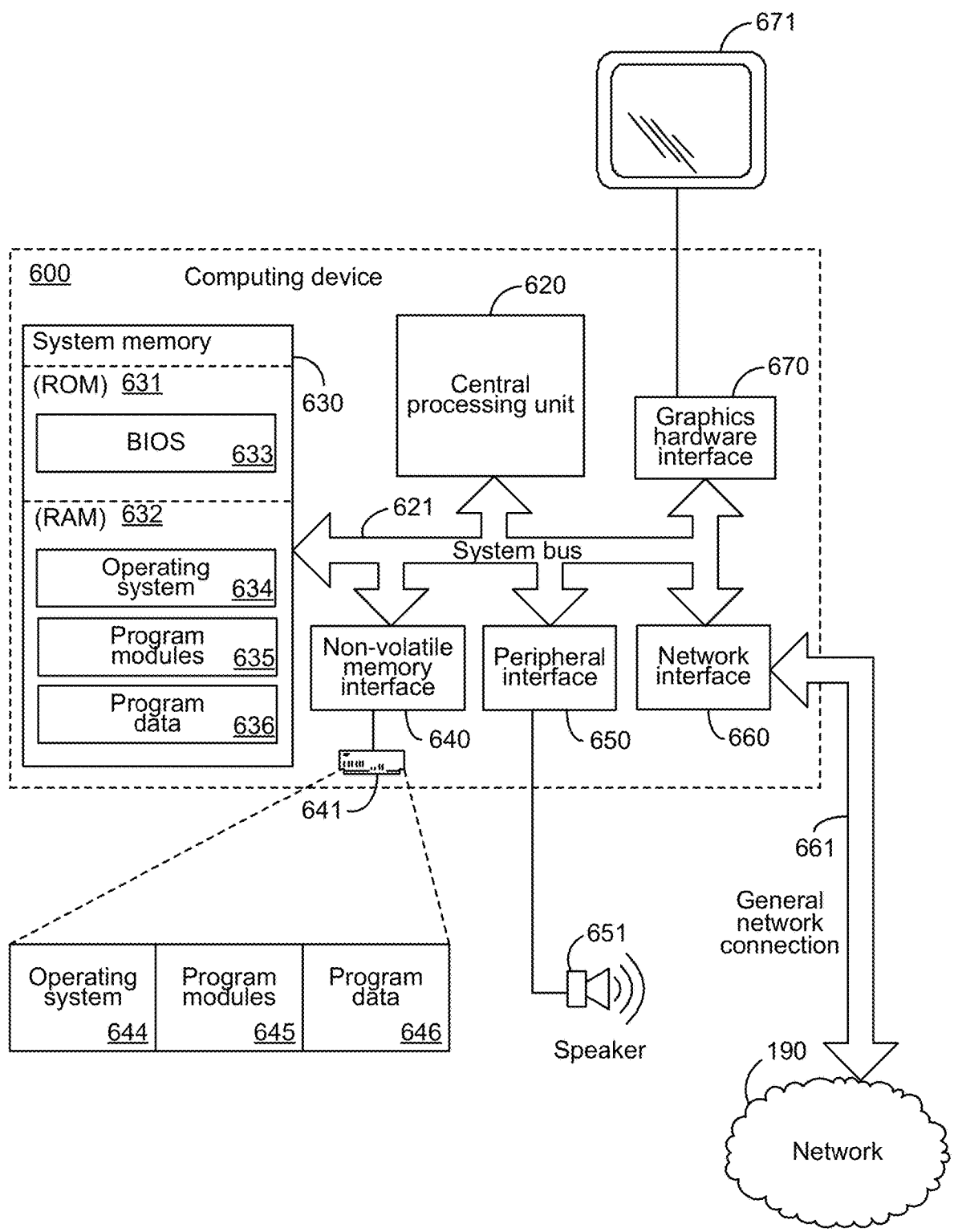
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 670 and a display device 671, which can include display devices capable of receiving touch-based user input, such as a touch-sensitive, or multi-touch capable, display device. The computing device can further comprise peripherals for presenting information to a user in an aural manner, including, for example, sound-generating devices such as speakers. The exemplary computing device 600 is shown in FIG. 6 as comprising a peripheral interface 660, communicationally coupled to the system bus 621, with peripherals such as the speaker 651 communicationally coupled thereto. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 600. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a non-volatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 661 through a network interface or adapter 660, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 660, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a computing device for increasing user efficiency and interaction performance by visually displaying audibly presented options, the computing device comprising: one or more processing units; a speaker; a display device; and one or more computer-readable media comprising computer-executable instructions, which, when executed by the one or more processing units, cause the computing device to: determine a first communicational identifier utilized to establish a first communicational connection between the computing device and an automated voice system, the first communicational connection comprising presentation of a first set of options to the user by the automated voice system, the first set of options being audibly presented to the user through sound, in the form of voiced words, generated by the speaker; provide the first communicational identifier to a remote computing device independent of the automated voice system; receive the first set of options from the remote computing device in response to the providing if the first set of options are associated with the first communicational identifier by the remote computing device; transcribe the audible presentation, by the automated voice system, of the first set of options if the first set of options was not received from the remote computing device; display, to the user, the first set of options on the display device, either as received from the remote computing device, if the first set of options was received from the remote computing device, or as transcribed, if the first set of options was not received from the remote computing device; and provide the first set of options, as transcribed, to the remote computing device to be associated, by the remote computing device, with the first communicational identifier if the first set of options was not received from the remote computing device.

A second example is the computing device of the first example, wherein the one or more computer-readable media comprise further computer-executable instructions, which, when executed by the one or more processing units cause the computing device to: determine if the first communicational connection is with the automated voice system based on the first communicational connection being utilized to receive voiced words predetermined to be indicative of the automated voice system.

A third example is the computing device of the first example, wherein the one or more computer-readable media comprise further computer-executable instructions, which, when executed by the one or more processing units cause the computing device to: receive user input indicative of a selection of an option from among the first set of options; communicate the selection of the option to the automated voice system by transmitting an option selection identifier; and determine a second communicational identifier utilized to establish a second communicational connection between the computing device and the automated voice system, the second communicational connection comprising presentation of a second set of options directed to the selected option; wherein the second communicational identifier comprises the first communicational identifier concatenated with the option selection identifier.

A fourth example is the computing device of the first example, wherein the first communicational identifier is a telephone number concatenated with telephonically dialed numbers previously entered to sequentially select options in prior sequentially presented sets of options of the automated voice system.

A fifth example is the computing device of the first example, wherein the one or more computer-readable media comprise further computer-executable instructions, which, when executed by the one or more processing units cause the computing device to: transcribe the audible presentation of the first set of options even if the first set of options was received from the remote computing device; and provide the first set of options, as transcribed, to the remote computing device to update the first set of options associated with the first communicational identifier if the first set of options received from the remote computing device differs from the first set of options as transcribed.

A sixth example is the computing device of the first example, wherein the first set of options received from the remote computing device were previously provided to the remote computing device by another, different computing device also having one or more computer-readable media comprising the computer-executable instructions.

A seventh example is the computing device of the first example, wherein the one or more computer-readable media comprise further computer-executable instructions, which, when executed by the one or more processing units cause the computing device to: display, to the user, with the first set of options, a logo of a company associated with the automated voice system.

An eighth example is the computing device of the seventh example, wherein the one or more computer-readable media comprise further computer-executable instructions, which, when executed by the one or more processing units cause the computing device to: provide the first communicational identifier to a search engine as a search term; and find the logo from results provided by the search engine in response to the providing.

A ninth example is the computing device of the first example, wherein the display of the first set of options is on a same portion of the display device as a telephone keypad was previously displayed.

A tenth example is the computing device of the first example, wherein the display device is a touchscreen; and wherein further user input indicative of a selection of an option from among the first set of options is received through a user touch directed to a portion of the touchscreen on which the selected option is displayed.

An eleventh example is the computing device of the first example, wherein the one or more computer-readable media comprise further computer-executable instructions, which, when executed by the one or more processing units cause the computing device to: display, to the user, on the display device, with the first set of options, a search term entry area by which the first set of options can be searched.

A twelfth example is the computing device of the first example, wherein the one or more computer-readable media comprise further computer-executable instructions, which, when executed by the one or more processing units cause the computing device to: identify, from the transcribing, at least one option of the first set of options based on a response, from the automated voice system, confirming a spoken user input, the at least one option being a predefined option that was not previously enumerated, by the automated voice system, to the user.

A thirteenth example is a system for increasing user efficiency and interaction performance by visually displaying audibly presented options, the system comprising: a first client computing device comprising: one or more processing units; and one or more computer-readable media comprising computer-executable instructions, which, when executed by the one or more processing units, cause the first client computing device to: establish a first communicational connection with an automated voice system utilizing a first communicational identifier; transcribe an audible presentation, by the automated voice system, of a first set of options; provide the first set of options, as transcribed, and the first communicational identifier to a centralized audible menu visualization system; a second client computing device, differing from the first client computing device, the second client computing device comprising: one or more processing units; a display device; and one or more computer-readable media comprising computer-executable instructions, which, when executed by the one or more processing units, cause the second client computing device to: establish a second communicational connection with an automated voice system utilizing the first communicational identifier; provide the first communicational identifier to the centralized audible menu visualization system; receive the first set of options from the centralized audible menu visualization system in response to the providing; and display, to the user, the first set of options on the display device; and one or more server computing devices implementing the centralized audible menu visualization system, the server computing device comprising: processing units; computer-readable media comprising an audible menu database; and computer-readable media comprising computer-executable instructions, which, when executed by the processing units, cause the one or more server computing devices to: receive the transcribed first set of options and the first communicational identifier from the first client computing device; associate, in the audible menu database, the first set of options, as received from the first client computing device, with the first communicational identifier; receive the first communicational identifier from the second client computing device; obtain, from the audible menu database, based on the first communicational identifier, the first set of options; and provide, to the second client computing device, in response to the first communicational identifier, the first set of options.

A fourteenth example is the system of the thirteenth example, wherein the audible menu database comprises an incomplete option menu tree associated with the automated voice system, the entries in the option menu tree having been received from other client computing devices.

A fifteenth example is the system of the thirteenth example, wherein the first communicational identifier is a telephone number concatenated with telephonically dialed numbers previously entered to sequentially select options in prior sequentially presented sets of options of the automated voice system.

A sixteenth example is the system of the thirteenth example, wherein the audible menu database comprises a logo associated with the automated voice system.

A seventeenth example is the system of the sixteenth example, wherein the computer-readable media of the one or more server computing devices further comprise computer-executable instructions, which, when executed by the processing units, cause the one or more server computing devices to: provide the first communicational identifier to a search engine as a search term; and find the logo from results provided by the search engine in response to the providing.

An eighteenth example is a computing device for increasing user efficiency and interaction performance by visually displaying audibly presented options, the computing device comprising: one or more processing units; and one or more computer-readable media comprising computer-executable instructions, which, when executed by the one or more processing units, cause the computing device to: receive, from a first client computing device that has established a first communicational connection with an automated voice system utilizing a first communicational identifier, a transcribed first set of options and the first communicational identifier; associate, in an audible menu database, the first set of options, as received from the first client computing device, with the first communicational identifier; receive the first communicational identifier from a second client computing device that has established a second communicational connection with the automated voice system utilizing the first communicational identifier, the second client computing device differing from the first computing device; obtain, from the audible menu database, based on the first communicational identifier, the first set of options; and provide, to the second client computing device, in response to the first communicational identifier, the first set of options.

A nineteenth example is the computing device of the eighteenth example, wherein the first communicational identifier is a telephone number concatenated with telephonically dialed numbers previously entered to sequentially select options in prior sequentially presented sets of options of the automated voice system.

A twentieth example is the computing device of the eighteenth example, wherein the one or more computer-readable media comprise further computer-executable instructions, which, when executed by the processing units, cause the computing device to: provide the first communicational identifier to a search engine as a search term; find a logo from results provided by the search engine in response to the providing; and store an association between the automated voice system and the logo in the audible menu database.

As can be seen from the above descriptions, mechanisms for increasing user interaction performance through the visual displaying of options audibly presented by an automated voice system have been presented. In view of the many possible variations of the subject matter described herein, we claim as our invention all such embodiments as may come within the scope of the following claims and equivalents thereto.

We claim:

1. A computing device for increasing user efficiency and interaction performance by visually displaying audibly presented options, the computing device comprising:
one or more processing units;
a speaker;
a display device; and
one or more computer-readable storage media comprising computer-executable instructions, which, when executed by the one or more processing units, cause the computing device to:
determine a first communicational identifier utilized to establish a first communicational connection between the computing device and an automated voice system that, via the first communicational connection, presents a first set of options to the user in the form of a first set of voiced words, generated by the speaker;
provide the first communicational identifier to a remote computing device independent of the automated voice system;
receive, from the remote computing device, in response to the providing the first communicational identifier, data comprising the first set of options transcribed into textual form, the data having been crowdsourced from transcriptions of the first set of voiced words performed by one or more other computing devices that had previously established a communicational connection to the automated voice system;
display, to the user, the first set of options in textual form on the display device;
receive user input indicative of a selection of an option from among the first set of options;
communicate the selection of the option to the automated voice system by transmitting an option selection identifier;
determine a second communicational identifier utilized to establish a second communicational connection between the computing device and the automated voice system, which utilizes the second communicational connection to present a second set of options, directed to the selected option, to the user in the form of a second set of voiced words generated by the speaker;
provide the second communicational identifier to the remote computing device;
receive, from the remote computing device, in response to the providing the second communicational identifier, an indication that the remote computing device has no transcribed version of a set of options associated with the second communicational identifier;
transcribe the second set of voiced words based on the indication being received from the remote computing device;
display, on the display device, to the user, the second set of options in textual form, as transcribed by the computing device; and
provide the second set of options in textual form, as transcribed by the computing device, to the remote computing device to participate in the crowdsourcing.

2. The computing device of claim 1, wherein the one or more computer-readable storage media comprise further computer-executable instructions, which, when executed by the one or more processing units cause the computing device to:
determine if the first communicational connection is with a human or an automated system based on the first communicational connection being utilized to receive predetermined voiced words.

3. The computing device of claim 1, wherein the second communicational identifier comprises the first communicational identifier concatenated with the option selection identifier.

4. The computing device of claim 1, wherein the one or more computer-readable storage media comprise further computer-executable instructions, which, when executed by the one or more processing units cause the computing device to:
transcribe the first set of voiced words even though the data comprising the first set of options transcribed into textual form was received from the remote computing device; and
provide the first set of options, as transcribed by the computing device, to the remote computing device to participate in the crowdsourced transcription of the first set of options.

5. The computing device of claim 4, wherein the computer-executable instructions causing the computing device to provide the first set of options as transcribed by the computing device are only executed if the first set of options as transcribed by the computing device differ from the first set of options transcribed into textual form that was received from the remote computing device.

6. The computing device of claim 1, wherein the one or more computer-readable storage media comprise further computer-executable instructions, which, when executed by the one or more processing units cause the computing device to:
display, to the user, with the first set of options, a logo of a company associated with the automated voice system.

7. The computing device of claim 6, wherein the one or more computer-readable storage media comprise further computer-executable instructions, which, when executed by the one or more processing units cause the computing device to:
provide the first communicational identifier to a search engine as a search term; and
find the logo from results provided by the search engine in response to the providing.

8. The computing device of claim 1, wherein the display of the first set of options is on a same portion of the display device as a telephone keypad was previously displayed.

9. The computing device of claim 1, wherein the display device is a touchscreen; and wherein further the user input indicative of the selection of the option from among the first set of options is received through a user touch directed to a portion of the touchscreen on which the selected option was displayed.

10. The computing device of claim 1, wherein the one or more computer-readable storage media comprise further computer-executable instructions, which, when executed by the one or more processing units cause the computing device to:
display, to the user, on the display device, with the first set of options, a search term entry area by which the first set of options can be searched.

11. The computing device of claim 1, wherein the one or more computer-readable storage media comprise further computer-executable instructions, which, when executed by the one or more processing units cause the computing device to:
transcribe at least one option of the first set of options based on a response, from the automated voice system, confirming a spoken user input, the at least one option being a predefined option that was not previously enumerated, by the automated voice system, to the user.

12. A system for increasing user efficiency and interaction performance by visually displaying audibly presented options, the system comprising:
a first client computing device comprising:
a first one or more processing units; and
a first one or more computer-readable storage media comprising computer-executable instructions, which, when executed by the first one or more processing units, cause the first client computing device to:
establish, with an automated voice system, a first communicational connection utilizing a first communicational identifier;
transcribe a first audible presentation, by the automated voice system, of a first set of options into a first transcription of the first set of options; and
provide the first transcription of the first set of options and the first communicational identifier to a centralized audible menu visualization system;
a second client computing device comprising:
a second one or more processing units; and
a second one or more computer-readable storage media comprising computer-executable instructions, which, when executed by the second one or more processing units, cause the second client computing device to:
establish, with the automated voice system, a second communicational connection utilizing a second communicational identifier;
transcribe a second audible presentation, by the automated voice system, of a second set of options into a first transcription of the second set of options, the second set of options being presented by the automated voice system in response to a selection of one of the first set of options; and
provide the first transcription of the second set of options and the second communicational identifier to the centralized audible menu visualization system; and
one or more server computing devices implementing the centralized audible menu visualization system, the server computing device comprising:
server processing units;
server computer-readable storage media comprising an audible menu database; and
server computer-readable storage media comprising computer-executable instructions, which, when executed by the server processing units, cause the one or more server computing devices to:
populate the audible menu database by associating, in the audible menu database, the first transcription of the first set of options, as received from the first client computing device, with the first communicational identifier and the first transcription of the second set of options, as received from the second client computing device, with the second communicational identifier.

13. The system of claim 12, wherein the first communicational identifier is a telephone number and the second communicational identifier is the first communicational identifier concatenated with one or more telephonically dialed numbers entered to select the one of the first set of options.

14. The system of claim 12, wherein the audible menu database comprises a logo associated with the automated voice system.

15. The system of claim 14, wherein the server computer-readable storage media of the one or more server computing devices further comprise computer-executable instructions, which, when executed by the server processing units, cause the one or more server computing devices to:
provide the first communicational identifier to a search engine as a search term; and
find the logo from results provided by the search engine in response to the providing.

16. The system of claim 12, further comprising:
a third client computing device comprising:
third one or more processing units;
a display device; and
a third one or more computer-readable storage media comprising computer-executable instructions, which, when executed by the third one or more processing units, cause the third client computing device to:
establish a third communicational connection with the automated voice system utilizing the first communicational identifier;
provide the first communicational identifier to the centralized audible menu visualization system;

receive the first transcription of the first set of options from the centralized audible menu visualization system in response to the providing; and display, to the user, the first transcription of the first set of options on the display device;

wherein the server computer-readable storage media of the one or more server computing devices comprise further computer-executable instructions, which, when executed by the server processing units of the one or more server computing devices, cause the one or more server computing devices to:

receive the first communicational identifier from the third client computing device;

obtain, from the audible menu database, based on the first communicational identifier, the first transcription of the first set of options; and provide, to the third client computing device, in response to the first communicational identifier, the first transcription of the first set of options.

17. The system of claim 12, further comprising:
a third client computing device comprising:
a third one or more processing units; and
a third one or more computer-readable storage media comprising computer-executable instructions, which, when executed by the third one or more processing units, cause the third client computing device to:
establish, with the automated voice system, a third communicational connection utilizing the first communicational identifier;
transcribe a second audible presentation, by the automated voice system, of the first set of options into a second transcription of the first set of options; and
provide the second transcription of the first set of options and the first communicational identifier to the centralized audible menu visualization system;
wherein the computer-executable instructions causing the one or more server computing devices to populate the audible menu database comprise computer-executable instructions, which, when executed by the server processing units, cause the one or more server computing devices to:
generate an updated transcription of the first set of options based on the first transcription of the first set of options and the second transcription of the first set of options; and
associate, in the audible menu database, the updated transcription of the first set of options with the first communicational identifier.

18. A computing device for increasing user efficiency and interaction performance by visually displaying audibly presented options, the computing device comprising:
one or more processing units; and
one or more computer-readable storage media comprising computer-executable instructions, which, when executed by the one or more processing units, cause the computing device to:
receive, from a first client computing device, a first transcription of a first set of options and a first communicational identifier with which the first client computing device established a first communicational connection with an automated voice system that presented the first set of options to the first client computing devices in the form of a first set of voiced words that were subsequently transcribed by the first client computing device into the first transcription of the first set of options;
receive, from a second client computing device, a first transcription of a second set of options, the second set of options being presented by the automated voice system in response to a selection of one of the first set of options, and a second communicational identifier with which the second client computing device established a second communicational connection with the automated voice system that presented the second set of options to the second client computing devices in the form of a second set of voiced words that were subsequently transcribed by the second client computing device into the first transcription of the second set of options; and
populate an audible menu database by associating, in the audible menu database, the first transcription of the first set of options, as received from the first client computing device, with the first communicational identifier and the first transcription of the second set of options, as received from the second client computing device, with the second communicational identifier.

19. The computing device of claim 18, wherein the first communicational identifier is a telephone number and the second communicational identifier is the first communicational identifier concatenated with one or more telephonically dialed numbers entered to select the one of the first set of options.

20. The computing device of claim 18, wherein the computer-readable storage media comprise further computer-executable instructions, which, when executed by the one or more processing units, cause the computing device to:
receive, from a third client computing device, a second transcription of the first set of options and the first communicational identifier with which the third client computing device established a third communicational connection with the automated voice system that presented the first set of options to the second client computing devices in the form of the first set of voiced words that were subsequently transcribed by the third client computing device into the second transcription of the first set of options;
generate an updated transcription of the first set of options based on the first transcription of the first set of options and the second transcription of the first set of options; and
associate, in the audible menu database, the updated transcription of the first set of options with the first communicational identifier.

* * * * *